July 26, 1966   F. LAWN   3,263,153
INVERTER COMMUTATING CAPACITOR CHARGING SYSTEM
Filed Oct. 30, 1962   2 Sheets-Sheet 1

INVENTOR
FRANCIS LAWN
BY Donald J. Bradley
AGENT

INVENTOR
FRANCIS LAWN
BY Donald J. Bradley
AGENT

United States Patent Office 3,263,153
Patented July 26, 1966

3,263,153
INVERTER COMMUTATING CAPACITOR
CHARGING SYSTEM
Francis Lawn, Windsor, Conn., assignor to United Aircraft Corporation, East Hartford, Conn., a corporation of Delaware
Filed Oct. 30, 1962, Ser. No. 234,119
9 Claims. (Cl. 321—45)

This invention relates to a static inverter for converting direct current into alternating current, and particularly to an inverter in which gas tubes or silicon controlled rectifiers are used to provide the power. Inverters of this type commonly use commutating means such as capacitors to extinguish the power tubes at the proper time and thus provide the proper output voltage regulation and control. The commutating capacitors are controlled by means of an additional tube or rectifier as a control tube. This invention specifically relates to means for charging the commutating capacitors that will not dissipate as much energy as the previous methods.

It is therefore an object of this invention to provide a novel method of charging commutating capacitors in a static converter.

Another object of this invention is a static inverter that will not dissipate as much power as the prior art systems.

A further object of this invention is a novel static inverter circuitry using silicon controlled rectifiers for the power tubes.

Figure 1:
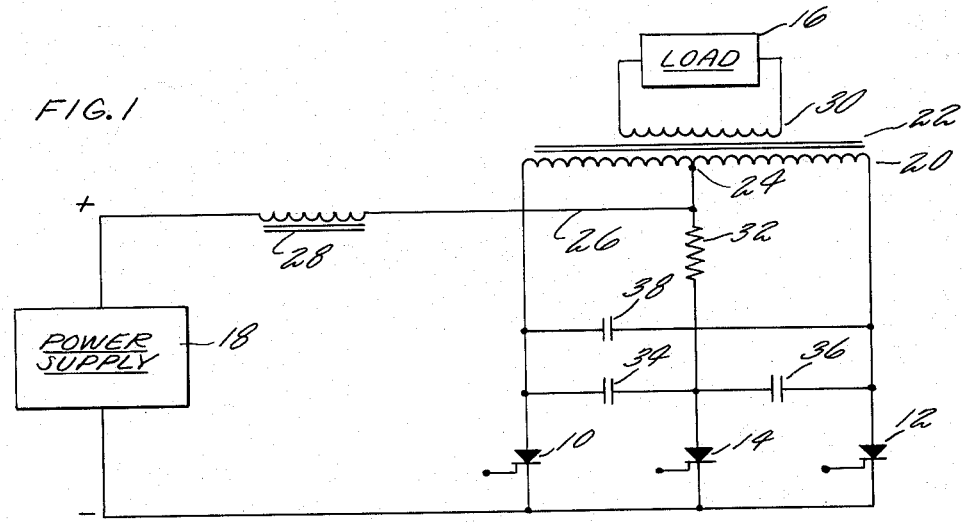
Figure 4:
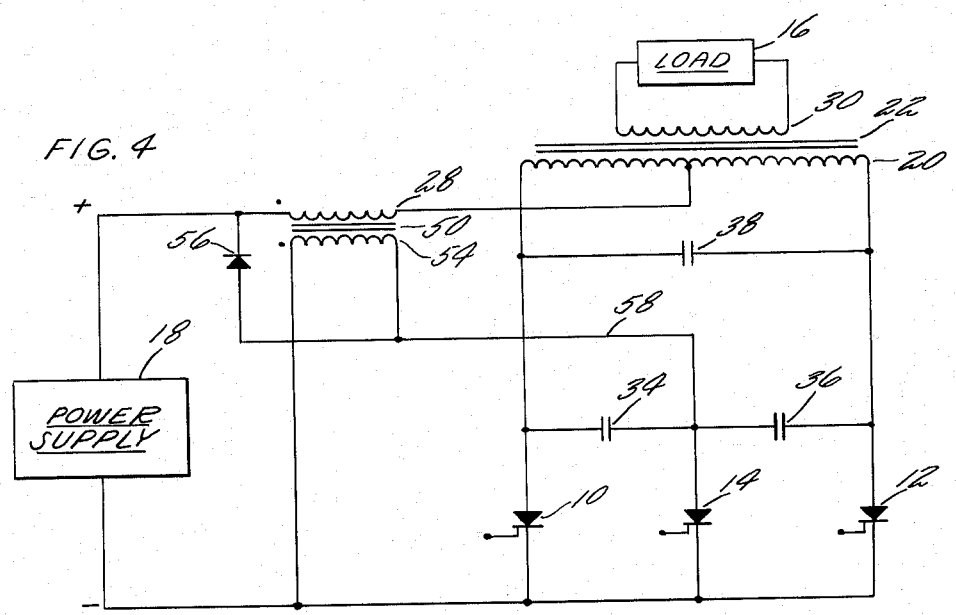
Figure 3:
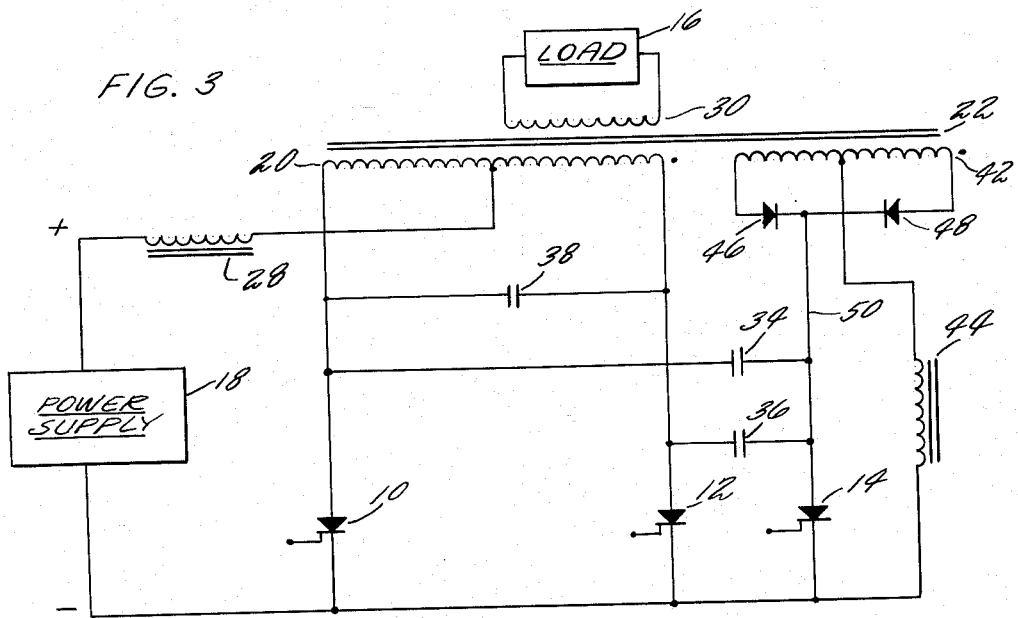
Figure 2:
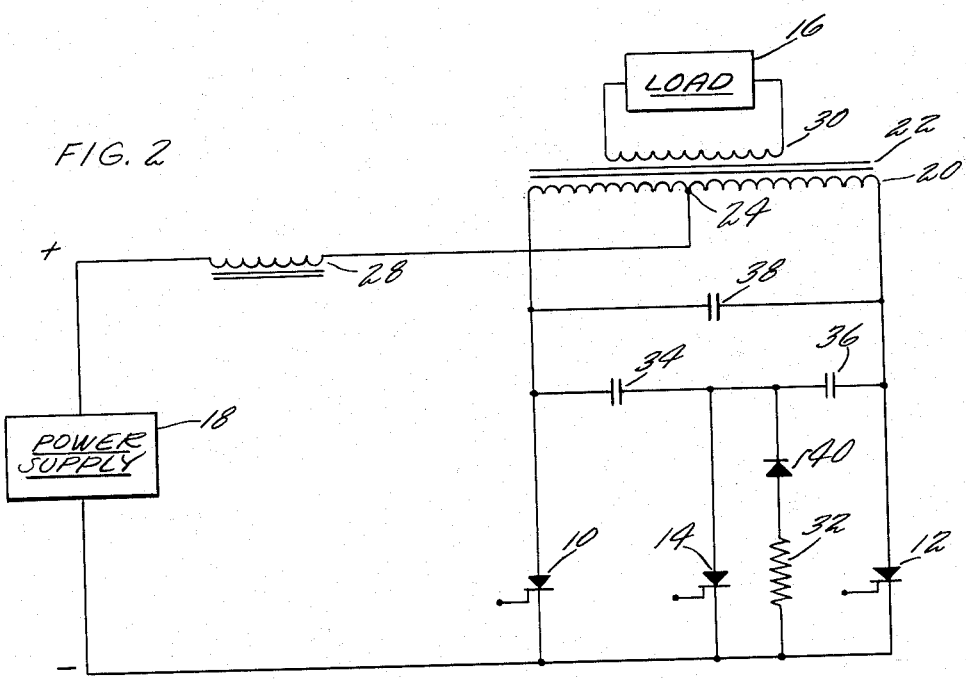

Other objects and a fuller understanding of the invention may be had by referring to the following description and claims, read in conjunction with the accompanying drawings, in which:

FIG. 1 shows a typical inverter circuit of the prior art in which the gas tubes commonly used have been replaced by silicon controlled rectifiers; and FIG. 2 is a modification of the circuit of FIG. 1; and FIG. 3 shows a reactive charging system for the commutating capacitors; and FIG. 4 is a schematic circuit diagram of another modification of inverter.

FIG. 1 shows a parallel type, single phase inverter identical to the inverter shown in my Patent No. 2,872,635 with the exception that silicon controlled rectifiers (SCR's) are used in place of the gas tubes shown in the patent. SCR's are the semi-conductor or solid state equivalent of gas tubes such as thyratrons and are preferred in many applications since SCR's are small, rugged, and consume less power and therefore are subject to less loss than corresponding gas tubes. In FIG. 1, power SCR's 10 and 12 are arranged to operate under the control of a control SCR 14 to deliver A.C. power to a load 16 from a source of D.C. power 18. Additional circuitry, not shown, controls the firing and timing of the SCR's. Representative control circuitry is described in my Patent No. 2,872,635. One possible system of driving the gates of the rectifiers will be described. Briefly, a multivibrator or other means for producing pulses feeds its pulse output to a bistable multivibrator or trigger type circuit. A change in the state of the flip-flop produces output square waves which are transformer coupled into an amplifier which also produces a square wave output. This square wave is then differentiated to produce an output pulse which is selectively fed to the gates of the rectifiers or power tubes to actuate the tubes.

The anodes of the power SCR's 10 and 12 are connected through conductors to opposite ends of primary winding 20 of an output transformer 22, representing the load thereon as reflected from the load 16 to the transformer 22. The primary winding 20 has a center tap 24 connected by a conductor 26 to the positive terminal of the D.C. source 18 through choke 28. The load 16 is connected across the secondary winding 30 of the output transformer 22.

The control SCR 14 has its anode connected through resistor 32 and choke 28 to the positive terminal of the D.C. power source 18.

Control SCR 14 is fired once for each firing of either of the power SCR's 10 and 12. The system is so arranged that the SCR 14 is fired at a predetermined time interval. In a representative arrangement, SCR 14 is fired 150° after firing of each power SCR.

To extinguish the power SCR's, the anodes of the control SCR 14 and the power SCR's 10 and 12 are cross connected through commutating means which can take the form of a capacitor 34 connected between the anodes of the SCR's 10 and 14, a capacitor 36 connected between the anodes of the SCR's 12 and 14 and, preferably, although not necessarily, a capacitor 38 connected between the anodes of the SCR's 10 and 12. By means of these connections, the firing of the control SCR 14 extinguishes whichever of the power SCR's 10 or 12 happens to be firing, and conversely when either one of the power SCR's 10 or 12 is fired it is able to extinguish the control SCR 14. The extinguishing action as between the control and power SCR's is brought about by the capacitors 34 and 36, with the capacitor 38 serving as a safety device to enable one power SCR to extinguish the other in the event the control SCR 14 for any reason fails to do so previously. Capacitor 38 also allows a path for inductive current when the inverter feeds an inductive load.

If none of the SCR's is conducting, with a D.C. voltage $E_p$ applied to the plate electrodes of the three rectifiers 10, 12 and 14 equally, no voltage appears across the commutating capacitors 34, 36 and 38. When the gate of the SCR 10 is pulsed from the control circuitry, not shown, the SCR 10 fires, causing the voltage on its anode to drop toward zero, stabilizing at a positive value of approximately 1 volt occasioned by the SCR voltage drop. The voltages on the anodes of the SCR's 12 and 14 will, therefore, be caused to drop to 1 volt due to the inability of the capacitors 34 and 36 to charge instantaneously. The anode of the SCR 10 will remain at 1 volt as long as the SCR is conducting, but the voltages on the anodes of the SCR's 12 and 14 will increase, the rate of increase for the SCR 12 being determined by the values of the choke 28, the capacitors 34, 36 and 38 and the load 16, and the rate of increase of voltage on the anode of the SCR 14 being determined by the value of the choke 28, and the impedance of resistor 32 and the capacitors 34, 36 and 38. While the SCR 10 is conducting the voltage on the anode of the SCR 12 will approach $2E_p-1$ volt because the center tapped primary transformer winding 20 must have equal voltages in its two halves, and the voltage on the anode of the rectifier 14 will approach $E_p$ assuming that the commutating capacitors have equal capacitance.

Before the completion of a complete half cycle or 180° of the output wave form, the SCR 14 is fired by a pulse from the control circuitry and the voltage at the anode of SCR 14 drops to approximately 1 volt. At this instant, because the voltage across the capacitors 34, 36 and 38 cannot change instantaneously, the voltage on the anode of the SCR 10 drops to the negative value of $E_p$ minus 1 volt, thus extinguishing the rectifier 10. The voltage on the anode of the SCR 12 drops to $E_p$. The voltage on the anode of the SCR 14 will remain at 1 volt as long as the SCR is conducting while the voltages on the anodes of the SCR's 10 and 12 will increase.

The SCR's can be arranged to fire in the above sequence, i.e., 10, 14, 12, 14, 10, 14, and so on. The output voltage will be a function of the D.C. input voltage from the source 18, the impedance of the load 16 and the number of degrees that the control SCR 14 permits the power SCR's 10 and 12 to conduct.

The principle described above may be applied to a single ended transformer using a single driving or power SCR and a single control SCR. In addition, separate control tubes or SCR's may be used for each power SCR or tube in a parallel type arrangement. These modifications are described in my Patent 2,872,635.

In the above arrangement, commutating capacitors 36 and 34 are charged through resistor 32 from power source 18. When SCR 14 conducts it also draws current through resistor 32 and this results in a power loss. FIG. 2 shows a modification of the circuit of FIG. 1 and describes a method of charging the commutating capacitors that will not dissipate as much energy as the circuit of FIG. 1. In FIG. 2, resistor 32 has been disconnected from the center tap of the primary winding 20 and connected across control SCR 14 to the negative side of D.C. power source 18. With this arrangement the junction of the capacitors 34, 36, and SCR 14 goes more negative than the negative side of the D.C. supply when power SCR's 10 or 12 are fired. This system of charging the capacitors does not eliminate the power dissipated when the capacitors charge, but it does eliminate the power dissipated when the control SCR 14 is fired.

Referring to FIG. 2, when power SCR 10 fires, the voltage at its anode goes to approximately 1 volt and the voltage on the anode of SCR 12 goes to a voltage equal to or larger than $2E_p$. The voltage on the anode of control SCR 14 goes to a voltage equal to or larger than $E_p$ because capacitor 34 and 36 act as an A.C. voltage divider between the anode voltages on power SCR's 10 and 12. This leaves capacitor 34 charged to a voltage equal to or larger than $E_p$ with the positive terminal connected to the anode of control SCR 14. When control SCR 14 is fired, its anode voltage drops to approximately 1 volt, capacitor 34 cannot discharge instantaneously so the anode of power SCR 10 is driven negative and SCR 10 will shut off. When control SCR 14 is conducting, the anode voltage on power SCR 12 goes to approximately $2E_p$. Now capacitor 36 is charged to $2E_p$ with the positive terminal connected to the anode of power SCR 12 and the negative terminal connected to the anode of control SCR 14. 180° after power SCR 10 is fired, power SCR 12 is fired. Capacitor 36 now cannot discharge instantaneously so when the anode of power SCR 12 drops to approximately 1 volt, the anode of SCR 14 is driven negative to approximately $-2E_p$. Control SCR 14 will shut off. With power SCR 12 conducting and the anode of control SCR 14 is driven to $-2E_p$, the path for charging the commutating capacitors is through resistor 32 and diode 40 connected in series with resistor 32. Current will flow through resistor 32 and diode 40 until the anode of control SCR 14 goes to zero volts. Power SCR 12 is conducting so the anode of power SCR 10 goes to $2E_p$ or more. The anode of control SCR 14 will go to $E_p$ due to the voltage divider action of capacitors 34 and 36. When control SCR 14 fires, it shuts off power SCR 12 by driving its anode negative through capacitor 36.

While not shown, resistor 32 may be replaced with an inductance. There are two advantages to using an inductance rather than a resistor. First, the power loss in the resistor is considerably decreased when a choke is used. Second, the commutating capacitor may be charged to a higher voltage when a choke is used because the energy stored in the choke will charge the capacitors above the zero voltage level.

The capacitor 38 connected between the anodes of SCR's 10 and 12 is not needed when the load 16 is resistive, but it may be necessary when the load is inductive to compensate for the inductance added to the circuit by the load as reflected through transformer winding 20.

While not shown in FIG. 2, a diode may be connected between the junction of capacitors 34, 36 and control SCR 14 to the positive terminal of power supply 18 to provide a current path if the voltage at the anode of SCR 14 exceeds the supply voltage. The cathode of the diode would be connected to the power supply, and the diode would conduct when the capacitor voltages became more positive than the supply. The connection is similar to that to be described in FIG. 4.

FIG. 3 shows another and more effective method of saving the power dissipated in charging the commutating capacitors. This circuit improves the previous method by a number of steps. The first step is replacing the resistor 32 of circuits 1 and 2 by an inductance. The use of an inductance rather than a resistor charges the capacitors 34 and 36 to a higher voltage and thus requires less capacitance. In addition, capacitors 34 and 36 may be charged to any desired voltage by the choice of voltage tapped from the output transformer, as will be described.

Referring now particularly to FIG. 3, a winding 42 is wound on transformer 22. An inductor 44 is shown connected between a center tap of winding 42 and the negative side of power supply 18; however, it is understood that a resistor may also be used. A pair of diodes 46 and 48 are connected in opposition across winding 42. The junction of diodes 46 and 48 is connected to the junction of capacitors 34 and 36 through a connector 50.

The operation of the circuit is as follows: Assuming that the turns ratio of winding 42 and winding 20 is a 1:1 ratio, when power SCR 10 conducts, current will flow from the positive side of the voltage source 18 through inductor 28, primary winding 20 and through power SCR 10 to the negative side of power supply 18. At the same time a voltage will be induced across winding 42 and will flow from the right-hand terminal of winding 42 through diode 48, line 50, through capacitor 34, power SCR 10 and back through inductor 44 to the center tap of winding 42. The voltage across capacitor 34 will reach $2E_p$ or more with the positive terminal connected to the anode of control SCR 14 and the negative terminal connected to the anode of power SCR 10. Capacitor 36 will not be charged at this time if the turns ratio of windings 20 and 42 are equal. When control SCR 14 is fired, the anode of SCR 10 will swing negative, since capacitor 34 cannot discharge instantaneously, and SCR 10 will shut off.

When power SCR 12 is fired, the voltage induced across winding 42 will be reversed, and current will flow from the left-hand side of winding 42 through diode 46, line 50, through capacitor 36 and power SCR 12 and back to the center tap of winding 42 through inductor 44. This will charge capacitor 36, with the negative side of the capacitor being connected to the anode of power SCR 12. Now when control SCR 14 is fired, power SCR 12 will be turned off as described previously in connection with power SCR 10.

The advantage of this charging circuit is that no resistance is used in the charging circuit, and consequently the losses are low. The turns ratio of winding 42 can be set as desired to take full advantage of the power rating of the commutating capacitors 34 and 36.

FIG. 4 shows another system for charging the commutating capacitors that will not dissipate much power. In this modification, choke 28 is converted into a transformer 50 having a secondary winding 54. Secondary winding 54 is connected at one end to the negative side of power source 18. The other side of winding 54 is connected through a line 58 to the junction of capacitors 34 and 36. A diode 56 is connected between the positive side of power supply 18 to the end of secondary winding which is joined to the capacitor junction.

In operation, when SCR 10 conducts, current flows from power supply 18 through inductor 28, one-half of transformer primary winding 20 and through SCR 10. If the load is primarily resistive, primary winding 20 will act as a small resistor in the circuit. If SCR 14 has been conducting, its anode voltage will be one volt. When SCR 10 conducts, its anode voltage will drop, and capacitor 34 will drive the anode of SCR 14 negative, turning off SCR 14. At the same time, the surge of current through inductor 28 will cause the entire supply voltage to appear across inductor 28. Transformer 50 will cause this voltage to appear across secondary winding 54, with the negative portion of the winding being connected to the junction of capacitors 34 and 36, thus assisting in driving the junction negative and turning off SCR 14. After a time, the initial current surge will subside and capacitor 38 will begin to charge, eventually reaching a voltage of up to four times the source voltage. At this time the voltage across inductor 28 will reverse directions, and capacitor 34 will charge to approximately source voltage or above, with its negative side connected to the anode of SCR 10, which is at one volt. If the voltage at the junction of capacitors 34 and 36 exceeds the source voltage, diode 56 will conduct, clamping this voltage to source.

When SCR 14 is turned on, the power stored in inductor 28 as reflected through winding 54 provides the current for the SCR. When SCR 14 conducts, its anode drops to one volt and capacitor 34 turns SCR 10 off. Capacitor 36 then is charged and ready to extinguish SCR 14 when SCR 12 conducts later.

Capacitor 38 appears in the circuit as electrically in series with choke 28 and primary winding 20, and the circuit acts as an LCR circuit. While the theory of the circuit operation is not exactly understood at present, and the above explanation may not be precise, experimentation has shown that the circuit operates as described above, and consumes far less power than the prior art circuits.

It is apparent that modifications and changes may be made in the operation and structure of the invention as described above without departing from the scope of the invention. The description has been made only by way of example, and is not to be taken as limiting the invention.

I claim:

1. In an inverter for delivering alternating current to a load, a source of direct current and voltage, first and second power switch means for producing power, control switch means, first and second commutating capacitor means connected respectively between said control switch means and said first power switch means and between said control switch means and said second power switch means for opening said power switch means in response to the closing of said control switch means and for opening said control switch means in response to the closing of said power switch means, an output transformer having a secondary winding connected to said load and a primary winding connected across said first and second power switch means, an inductor electrically connecting said current source with the center of said primary winding, means for closing said first and second power switch means cyclically and alternately and producing current flow from said source through said output transformer, means for closing said control switch means, and a series circuit combination comprising a diode and an impedance electrically connected in series, said series combination connected across said control switch means.

2. In a pulse width modulated inverter having a pair of controlled rectifiers adapted to be controlled by a third rectifier and means for cyclically and alternately firing said controlled rectifiers, the improvement comprising:
a source of direct current having an active terminal and a return terminal,
a transformer having a secondary and a primary winding,
said primary winding split into a first primary winding portion and a second primary winding portion, said winding portions having a common center point,
a first controlled rectifier connected in a series circuit relationship between said first winding portion and said return terminal,
a second controlled rectifier connected in a series circuit relationship between said second winding portion and said return terminal,
a first inductor electrically conected to said common center point and said active terminal,
a comutator capacitor combination having a first and second capacitor connected in series circuit relationship,
said capacitor combination electrically connected across said transformer primary winding,
a third controlled rectifier electrically connected to said return terminal and the point electrically common to said first and second capacitors,
a series circuit combination comprising a diode and an impedance electrically connected in series, and
said series circuit combination electrically connected to said return terminal and said point common to said first and second capacitors.

3. An inverter as in claim 2, where said impedance is a resistance.

4. An inverter as in claim 2 where said impedance is an inductor.

5. In a pulse width modulated inverter having a pair of controlled rectifiers adapted to be controlled by a third rectifier and means for cyclically and alternately firing said controlled rectifiers, the improvement comprising:
a source of direct current having an active terminal and a return terminal,
a transformer having a secondary and a primary winding,
said primary winding split into a first primary winding portion and a second primary winding portion, said winding portions having a common center point,
a first controlled rectifier connected in a series circuit relationship between said first winding portion and said return terminal,
a second controlled rectifier connected in a series circuit relationship between said second winding portion and said return terminal,
a first inductor electrically connected to said common center point and said active terminal,
a commutator capacitor combination having a first and second capacitor connected in series circuit relationship,
said capacitor combination electrically connected across said transformer primary winding,
a third controlled rectifier electrically connected to said return terminal and the point electrically common to said first and second capacitors, and
charging means inductively coupled to said primary winding and producing a signal proportional to the current flow in said primary winding and applying said signal to said point common to said first and second capacitors.

6. An inverter as in claim 5 where said charging means comprises:
a center tapped auxiliary winding inductively coupled to said primary winding and having a center tap,
an inductor electrically connected between said center tap and said return terminal,
a pair of series connected diodes having their like terminals connected,
said series connected diodes having their remaining terminals connected across said auxiliary winding, and
means for electrically connecting the point common to said diodes to said point common to said first and second capacitors.

7. In a pulse width modulated inverter having a pair of controlled rectifiers adapted to be controlled by a third rectifier and means for cylically and alternately firing said controlled rectifiers, the improvement comprising:
a source of direct current having an active terminal and a return terminal, a transformer having a secondary and a primary winding, said primary winding split into a first primary winding portion and a second primary winding portion, said winding portions having a common center point, a first controlled rectifier connected in a series circuit relationship between said first winding portion and said return terminal, a second controlled rectifier connected in a series circuit relationship between said second winding portion and said return terminal, a first inductor electrically connected to said common center point and said active terminal, a commutator capacitor combination having a first and second capacitor connected in series circuit relationship, said capacitor combination electrically connected across said transformer primary winding, charging means inductively coupled to said first inductor and producing a signal proportional to the current flow through said inductor and applying said signal to said point common to said first and second capacitors, and a third controlled rectifier electrically connected to said return terminal and the point electrically common to said first and second capacitors.

8. An inverter as in claim 7 where said charging means also includes a diode connected between said active terminal and said point common to said first and second capacitors.

9. In an inverter for delivering alternating current to a load, a source of direct current and voltage, first and second power switch means for producing power, control switch means, first and second commutating capacitor means connected respectively between said control switch means and said first power switch means and between said control switch means and said second power switch means for opening said power switch means in response to the closing of said control switch means and for opening said control switch means in response to the closing of said power switch means, an output transformer having a secondary winding connected to said load and a primary winding connected across said first and second power switch means, an inductor electrically connecting said current source with the center of said primary winding, means for closing said first and second power switch means cyclically and alternately and producing current flow from said source through said ouput transformer, means for closing said control switch means, charging means inductively coupled with said inductance and responsive to the voltage across said inductance for charging said capacitor means, a diode connected across said charging means and to said source, said diode conducting when said commutating capacitor means has charged to a voltage equal to said source voltage to thereby prevent excessive voltages from being applied to said switch means.

References Cited by the Examiner

UNITED STATES PATENTS

| | | | |
|---|---|---|---|
| 2,872,635 | 2/1959 | Lawn | 321—18 |
| 3,075,136 | 1/1963 | Jones | 321—45 |
| 3,085,190 | 4/1963 | Kearns et al. | 321—45 |
| 3,229,161 | 1/1966 | Williamson | 321—45 |

FOREIGN PATENTS 1,303,552  8/1962  France.

JOHN F. COUCH, *Primary Examiner.*

LLOYD McCOLLUM, *Examiner.*

J. M. THOMSON, W. SHOOP, *Assistant Examiners.*